United States Patent
Miyazaki et al.

(10) Patent No.: US 10,216,400 B2
(45) Date of Patent: Feb. 26, 2019

(54) DISPLAY CONTROL APPARATUS, AND METHOD AND COMPUTER-READABLE MEDIUM FOR SCROLLING OPERATION

(71) Applicant: BROTHER KOGYO KABUSHIKI KAISHA, Nagoya, Aichi (JP)

(72) Inventors: Sadaaki Miyazaki, Aichi (JP); Dai Kadota, Aichi (JP)

(73) Assignee: BROTHER KOGYO KABUSHIKI KAISHA, Nagoya, Aichi (JP)

(*) Notice: Subject to any disclaimer, the term of this patent is extended or adjusted under 35 U.S.C. 154(b) by 418 days.

(21) Appl. No.: 14/755,180

(22) Filed: Jun. 30, 2015

(65) Prior Publication Data

US 2015/0378550 A1    Dec. 31, 2015

(30) Foreign Application Priority Data

Jun. 30, 2014  (JP) .................................. 2014-135055

(51) Int. Cl.
G06F 3/0488    (2013.01)
G06F 3/0485    (2013.01)
G06F 3/0482    (2013.01)

(52) U.S. Cl.
CPC .......... *G06F 3/0485* (2013.01); *G06F 3/0482* (2013.01); *G06F 3/04883* (2013.01); *G06F 3/04886* (2013.01); *G06F 2203/04803* (2013.01)

(58) Field of Classification Search
CPC .. G06F 3/0488; G06F 3/0482; G06F 3/04845; G06F 3/0485
See application file for complete search history.

(56) References Cited

U.S. PATENT DOCUMENTS 5,682,563 A * 10/1997 Shinohara .............. G03B 17/18
                                                   396/287
5,825,349 A * 10/1998 Meier .................. G06F 3/04812
                                                   345/678

(Continued)

FOREIGN PATENT DOCUMENTS

JP    2002-091673 A    3/2002
JP    2004-139321 A    5/2004

(Continued)

OTHER PUBLICATIONS

Offical Action dated Feb. 27, 2018 received in Japanese Patent Application No. JP 2014-135055 together with an English language translation.

*Primary Examiner* — Jung-Mu T Chuang
(74) *Attorney, Agent, or Firm* — Scully, Scott, Murphy & Presser, P.C.

(57) ABSTRACT

A display controller including a storage storing a list image including a plurality of object images, a display having a display area configured to concurrently display a particular number of object images, and a control unit configured to display the particular number of object images arranged along a particular direction in the display area, display a specific indication image indicating a specific direction along the particular direction, detect a dragging operation of dragging the specific indication image in the specific direction, detect a dragging operation amount of the detected dragging operation, and control the display such that the particular number of object images are scrolled in the particular direction at a scrolling speed, the scrolling speed being associated with the detected dragging operation amount.

14 Claims, 10 Drawing Sheets

(56) References Cited

U.S. PATENT DOCUMENTS

| | | | |
|---|---|---|---|
| 6,489,951 B1* | 12/2002 | Wong | G06F 3/04886 345/173 |
| 7,111,240 B2* | 9/2006 | Crow | G06F 3/048 715/723 |
| 7,366,995 B2* | 4/2008 | Montague | G06F 3/04845 715/769 |
| 7,844,915 B2* | 11/2010 | Platzer | G06F 3/04845 715/781 |
| 7,877,705 B2* | 1/2011 | Chambers | G06F 3/0485 345/173 |
| 8,345,068 B1* | 1/2013 | Goodwin | G06F 3/0485 345/173 |
| 8,601,389 B2* | 12/2013 | Schulz | G06F 3/0482 345/156 |
| 8,656,311 B1* | 2/2014 | Harper | G06F 3/0488 345/532 |
| 9,110,579 B2* | 8/2015 | Miyazaki | G06F 3/0488 |
| 9,441,913 B1* | 9/2016 | Donahoe | F41G 1/467 |
| 9,465,531 B2* | 10/2016 | Miyazaki | G06F 3/0488 |
| 9,665,268 B2* | 5/2017 | Kim | H04M 1/72555 |
| 2002/0035613 A1 | 3/2002 | Hirayama | |
| 2005/0168488 A1* | 8/2005 | Montague | G06F 3/04845 345/659 |
| 2005/0223342 A1* | 10/2005 | Repka | G06F 3/0481 715/851 |
| 2006/0004873 A1* | 1/2006 | Wong | G06F 17/30572 |
| 2007/0024646 A1* | 2/2007 | Saarinen | G06F 3/0485 345/660 |
| 2007/0120832 A1* | 5/2007 | Saarinen | G06F 3/0485 345/173 |
| 2007/0192744 A1* | 8/2007 | Reponen | G06F 3/0236 715/833 |
| 2008/0016468 A1* | 1/2008 | Chambers | G06F 3/0485 715/835 |
| 2008/0168384 A1* | 7/2008 | Platzer | G06F 3/04845 715/784 |
| 2009/0216683 A1* | 8/2009 | Gutierrez | G06F 17/30058 705/80 |
| 2010/0122214 A1* | 5/2010 | Sengoku | G06F 3/0485 715/830 |
| 2011/0018833 A1* | 1/2011 | Kim | G06F 3/0485 345/173 |
| 2011/0035700 A1* | 2/2011 | Meaney | G06F 3/048 715/784 |
| 2011/0167387 A1* | 7/2011 | Stallings | G06F 3/04817 715/826 |
| 2011/0199318 A1* | 8/2011 | Fong | G06F 3/0488 345/173 |
| 2012/0030625 A1* | 2/2012 | Miyazaki | G06F 3/0488 715/830 |
| 2012/0030635 A1* | 2/2012 | Miyazaki | G06F 3/0482 715/863 |
| 2012/0030636 A1* | 2/2012 | Miyazaki | G06F 3/0488 715/863 |
| 2012/0079420 A1* | 3/2012 | Arriola | G06F 3/0482 715/784 |
| 2012/0272183 A1* | 10/2012 | Jitkoff | G06F 3/0485 715/786 |
| 2013/0131978 A1* | 5/2013 | Han | G01C 21/3638 701/436 |
| 2014/0282011 A1* | 9/2014 | Dellinger | G06F 3/0482 715/731 |
| 2015/0180435 A1* | 6/2015 | Marino | H03G 3/10 381/107 |
| 2015/0204958 A1* | 7/2015 | Van Meel | G01R 33/5608 345/632 |
| 2015/0301604 A1* | 10/2015 | Cho | G06F 3/0416 715/702 |
| 2015/0355809 A1* | 12/2015 | Miyazaki | G06F 3/0488 715/769 |
| 2016/0170598 A1* | 6/2016 | Zambetti | G06F 3/0485 715/784 |
| 2016/0209939 A1* | 7/2016 | Zambetti | G06F 3/0362 |
| 2016/0239084 A1* | 8/2016 | Connor | A61B 5/0478 |

FOREIGN PATENT DOCUMENTS

| | | |
|---|---|---|
| JP | 2006-221390 A | 8/2006 |
| JP | 2013-254514 A | 12/2013 |

* cited by examiner

EXAMPLE OF BOUNDING OPERATION WHEN LIST IMAGE IS
SCROLLED DOWN UP TO WHERE ITS UPPER END APPEARS

COLOR OF ARROW ICON CHANGES
↓
BOUND
↓
COLOR OF ARROW ICON RETURNS

EXAMPLE OF SMALL BOUNDING OPERATION
WHEN UPPER END OF LIST IMAGE IS ALREADY DISPLAYED

THE ARROW ICON IS EXTENDED BY A SMALL EXTENSION AMOUNT FOR A SHORT PERIOD OF TIME, AND ITS COLOR CHANGES.

THE ARROW ICON BOUNDS, AND ITS COLOR IS RESTORED.

DISPLAY CONTROL APPARATUS, AND METHOD AND COMPUTER-READABLE MEDIUM FOR SCROLLING OPERATION

CROSS-REFERENCE TO RELATED APPLICATION

This application claims priority under 35 U.S.C. § 119 from Japanese Patent Application No. 2014-135055 filed on Jun. 30, 2014. The entire subject matter of the application is incorporated herein by reference.

BACKGROUND

Technical Field

The following description relates to one or more aspects of a display controller configured to display a plurality of object images arranged in a particular direction, and a method and a computer-readable medium for the display controller.

Related Art

In various types of information processing devices such as multi-function peripherals and mobile information terminal devices, there is a case where a list image including object images arranged in a row is displayed on a display. Each object image represents a corresponding function or a corresponding setting item. When the object images included in the list image are too many to be displayed all at the same time on the display, a part of the object images included in the list image is displayed on the display.

In this case, as a method for displaying object images that are not displayed on the display, for instance, a method has been known for scrolling the list image by pressing and operating arrow keys provided at the information processing devices.

Further, for instance, a method has been known for scrolling the list image by operating (e.g., tapping) arrow images displayed next to the list image.

SUMMARY

The aforementioned known scrolling methods are not necessarily user-friendly. This is because it might take a long time before an intended object image is displayed on the display. In particular, as the list image includes a larger number of the object images, it is more likely to take a long time before the intended object image is displayed.

Aspects of the present disclosure are advantageous to provide one or more techniques to improve user-friendliness of a display controller when a user scrolls a list image displayed on a display.

According to aspects of the present disclosure, a display controller is provided, the display controller including a storage configured to store a list image, the list image including a plurality of object images, a display having a display area, the display area being configured to concurrently display a particular number of object images of the plurality of object images, and a control unit configured to display the particular number of object images arranged along a particular direction in the display area, display a specific indication image in the display area, the specific indication image indicating a specific direction along the particular direction, detect a dragging operation of dragging the specific indication image in the specific direction, detect a dragging operation amount of the detected dragging operation, and control the display such that the particular number of object images are scrolled in the particular direction at a scrolling speed, the scrolling speed being associated with the detected dragging operation amount.

According to aspects of the present disclosure, further provided is a method adapted to be implemented on a processor coupled with a storage configured to store a list image, the list image including a plurality of object images, and a display having a display area, the display area being configured to concurrently display a particular number of object images of the plurality of object images, the method including displaying the particular number of object images arranged along a particular direction in the display area, displaying a specific indication image in the display area, the specific indication image indicating a specific direction along the particular direction, detecting a dragging operation of dragging the specific indication image in the specific direction, detecting a dragging operation amount of the detected dragging operation, and controlling the display such that the particular number of object images are scrolled in the particular direction at a scrolling speed, the scrolling speed being associated with the detected dragging operation amount.

According to aspects of the present disclosure, further provided is a non-transitory computer-readable medium storing computer-readable instructions that are executable by a processor coupled with a storage configured to store a list image, the list image including a plurality of object images, and a display having a display area, the display area being configured to concurrently display a particular number of object images of the plurality of object images, the instructions being configured to, when executed by the processor, cause the processor to display the particular number of object images arranged along a particular direction in the display area, display a specific indication image in the display area, the specific indication image indicating a specific direction along the particular direction, detect a dragging operation of dragging the specific indication image in the specific direction, detect a dragging operation amount of the detected dragging operation, and control the display such that the particular number of object images are scrolled in the particular direction at a scrolling speed, the scrolling speed being associated with the detected dragging operation amount.

BRIEF DESCRIPTION OF THE ACCOMPANYING DRAWINGS

Figure 2A:
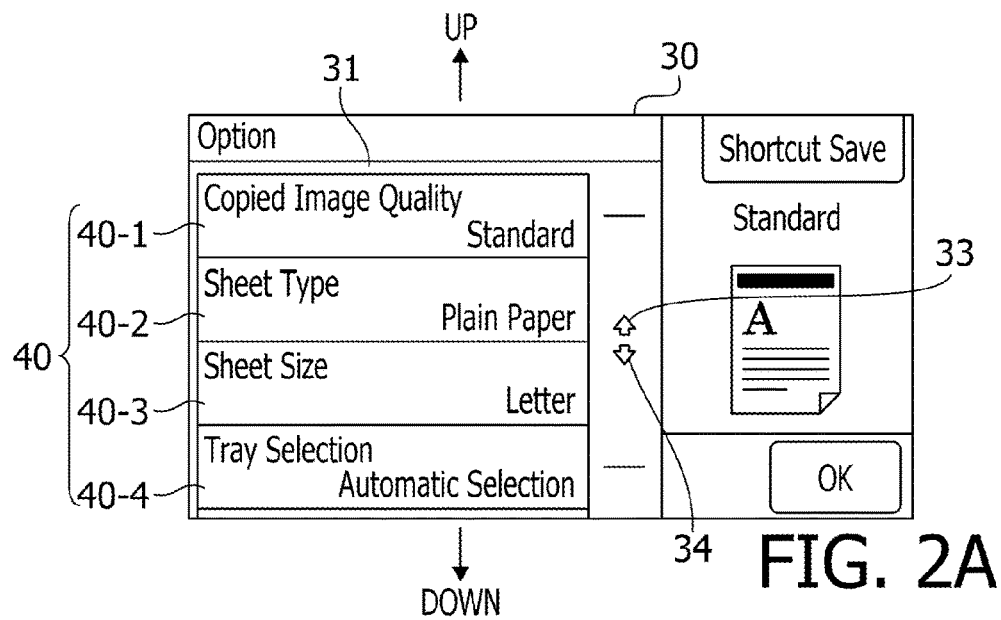

FIG. 2A exemplifies a copy function setting screen in the illustrative embodiment according to one or more aspects of the present disclosure.

Figure 2B:
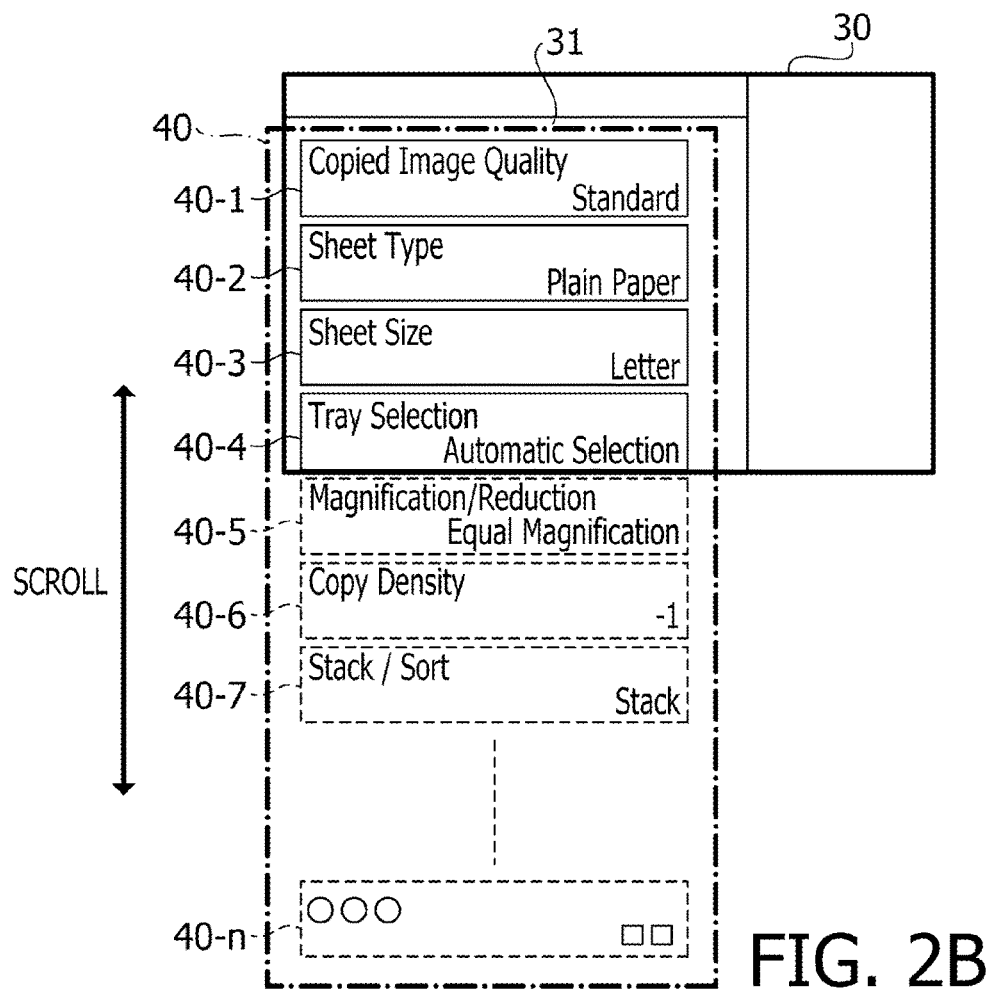

FIG. 2B schematically shows a whole list image in the illustrative embodiment according to one or more aspects of the present disclosure.

FIGS. 3A, 3B, 3C, and 3D illustrate a one of arrow icons to be extended and contracted in response to being dragged in the illustrative embodiment according to one or more aspects of the present disclosure.

Figure 4A:
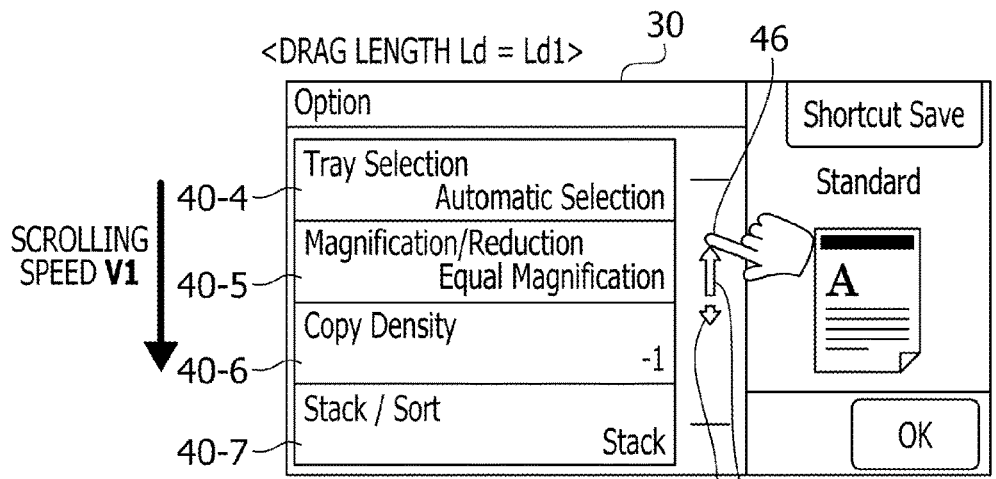
Figure 4B:
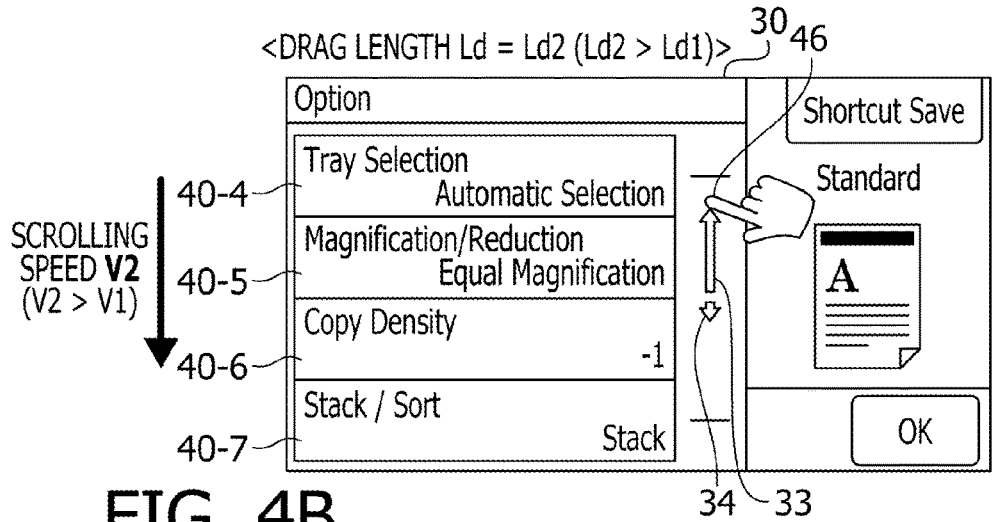
Figure 4C:
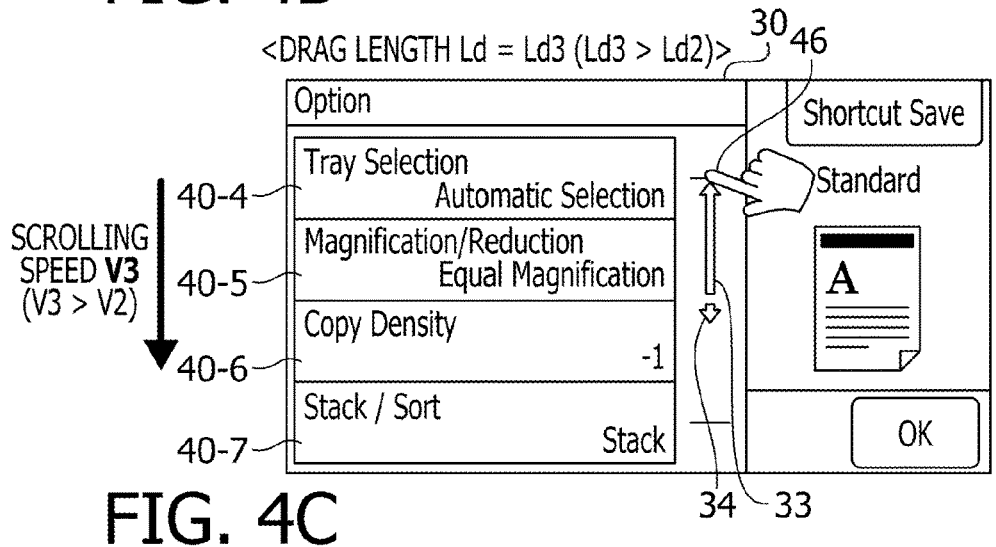

FIGS. 4A, 4B, and 4C illustrate a relationship between a drag length by which the pressed arrow icon is dragged and a scrolling speed at which the list image is scrolled, in the illustrative embodiment according to one or more aspects of the present disclosure.

Figure 5A:
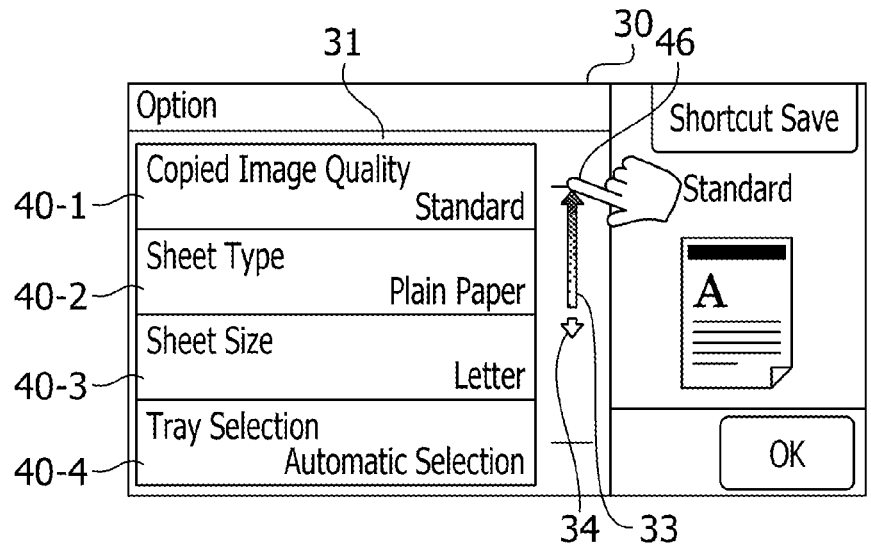
Figure 5B:
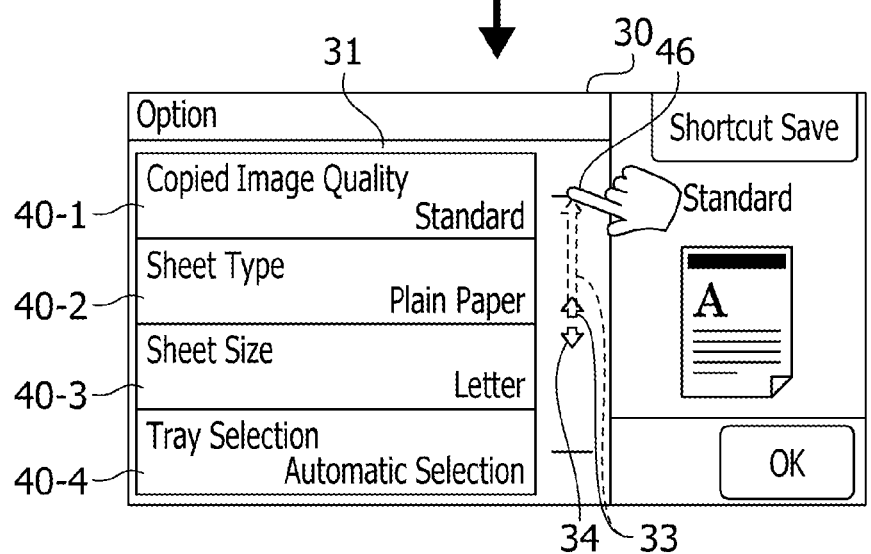

FIGS. 5A and 5B illustrate a bounding operation that the pressed arrow icon performs when the list image is scrolled up to where a tail end thereof in a scrolling direction appears in a list display area, in the illustrative embodiment according to one or more aspects of the present disclosure.

Figure 6A:
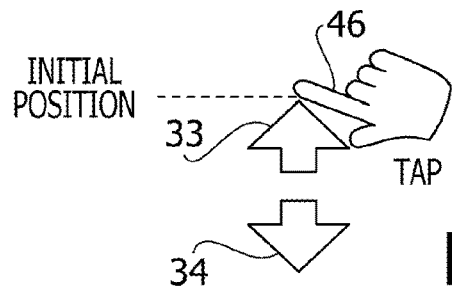
Figure 6B:
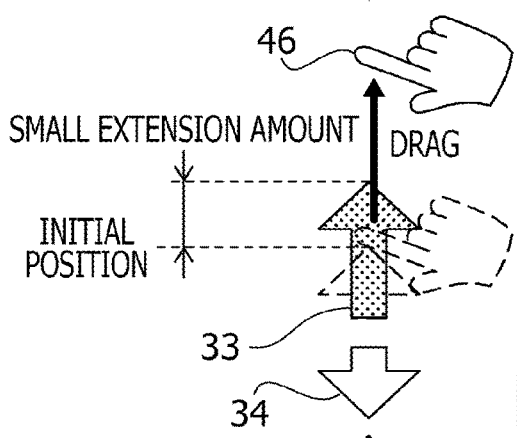
Figure 6C:

FIGS. 6A, 6B, and 6C illustrate a small bounding operation that the pressed arrow icon performs when the pressed arrow icon is further dragged in a state where the tail end of the list image in the scrolling direction is already displayed in the list display area, in the illustrative embodiment according to one or more aspects of the present disclosure.

Figure 7:
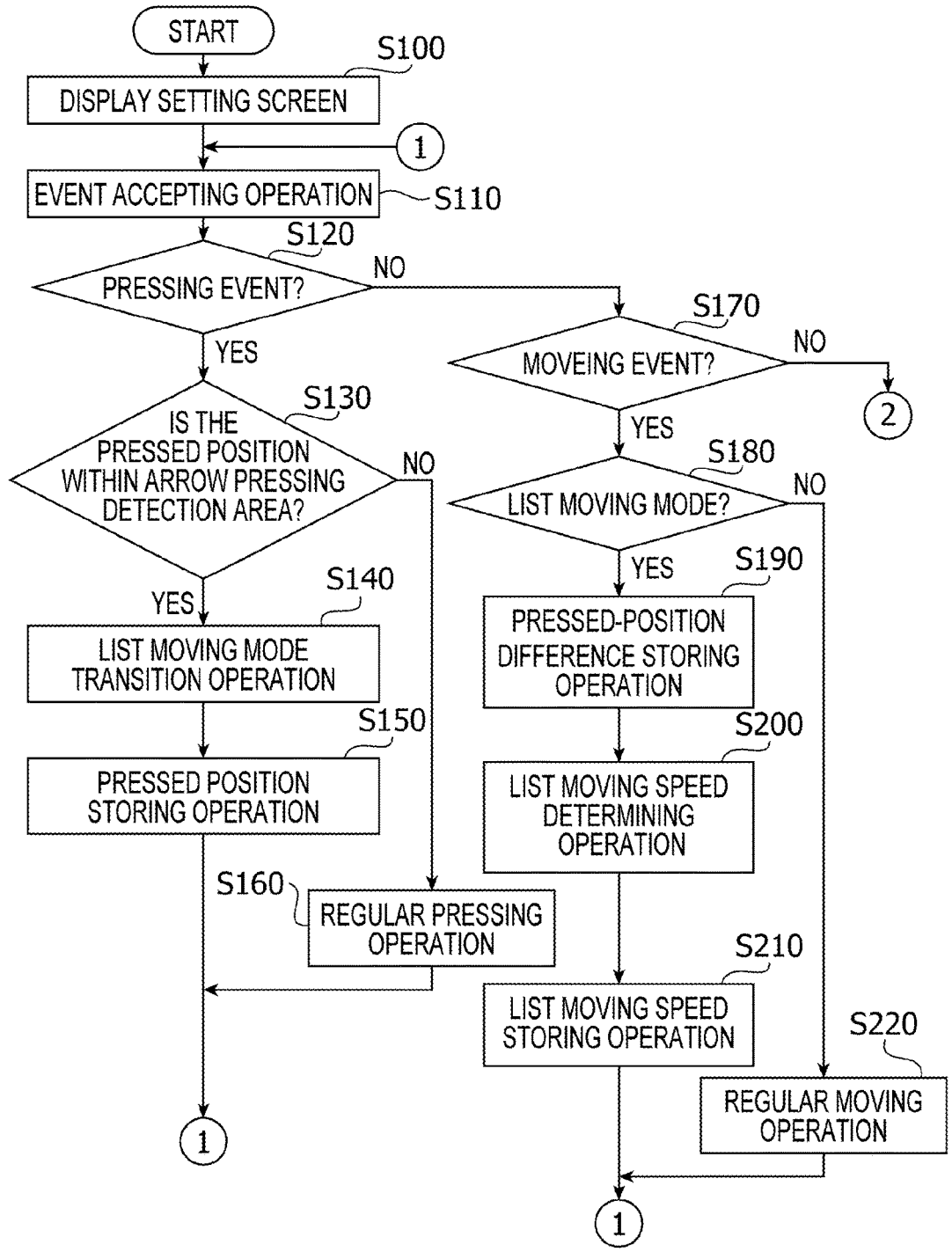
Figure 8:
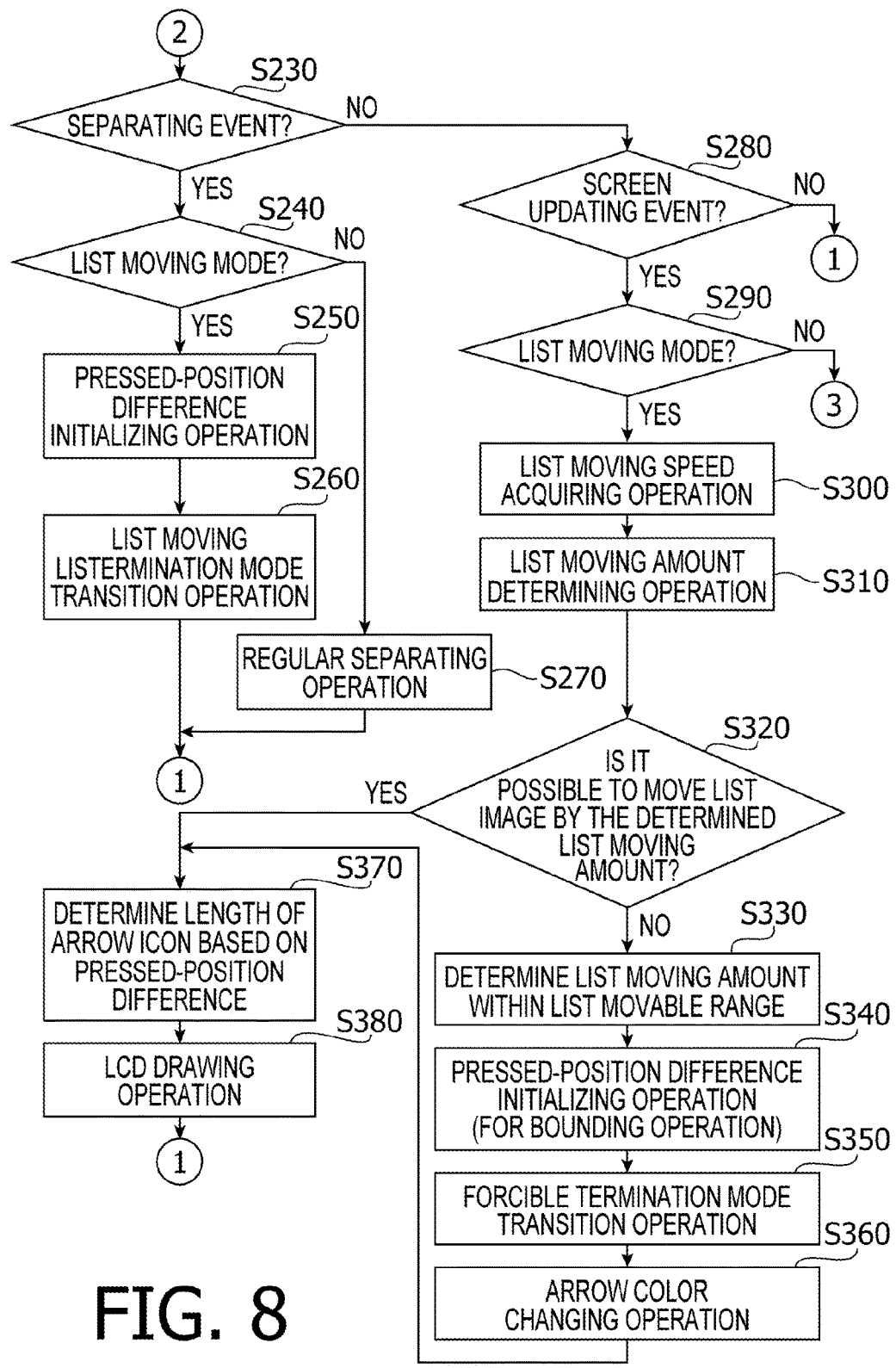
Figure 9:
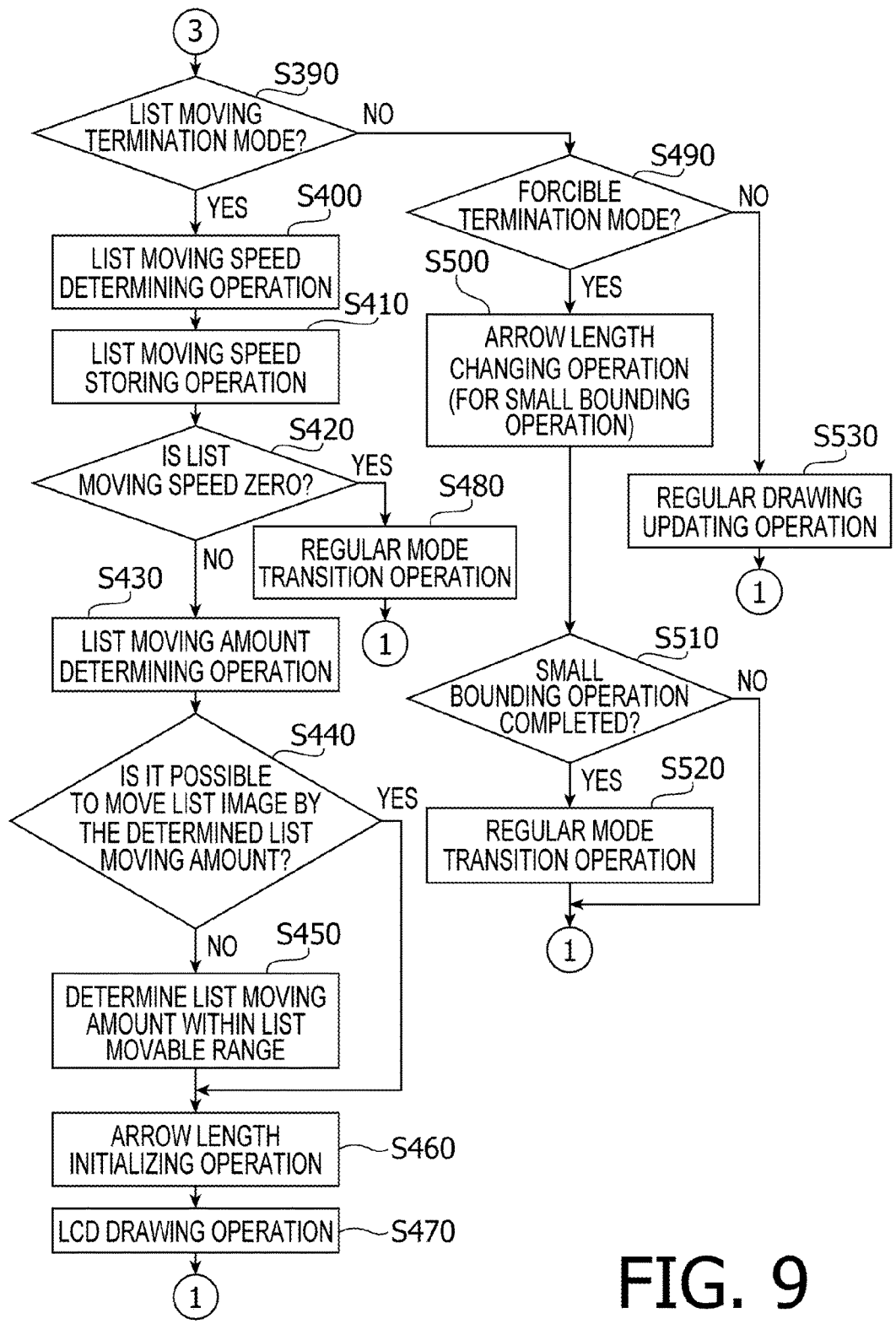

FIGS. 7, 8, and 9 are flowcharts showing a procedure of a display control process in the illustrative embodiment according to one or more aspects of the present disclosure.

Figure 10:
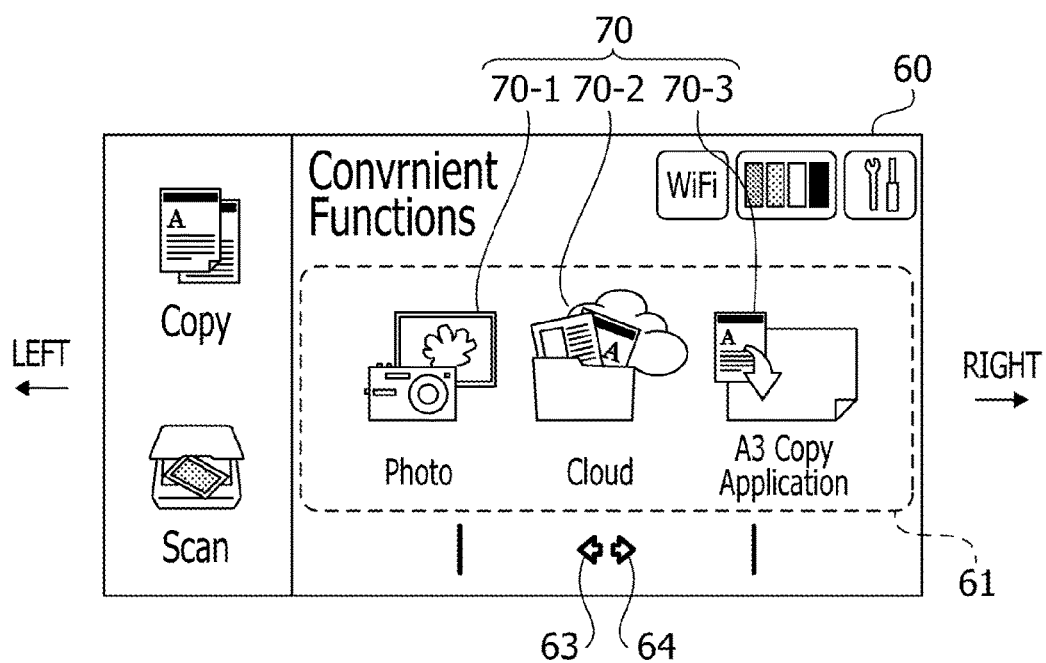

FIG. 10 exemplifies another list image in a modification according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

(1) Configuration of MFP

Figure 1A:
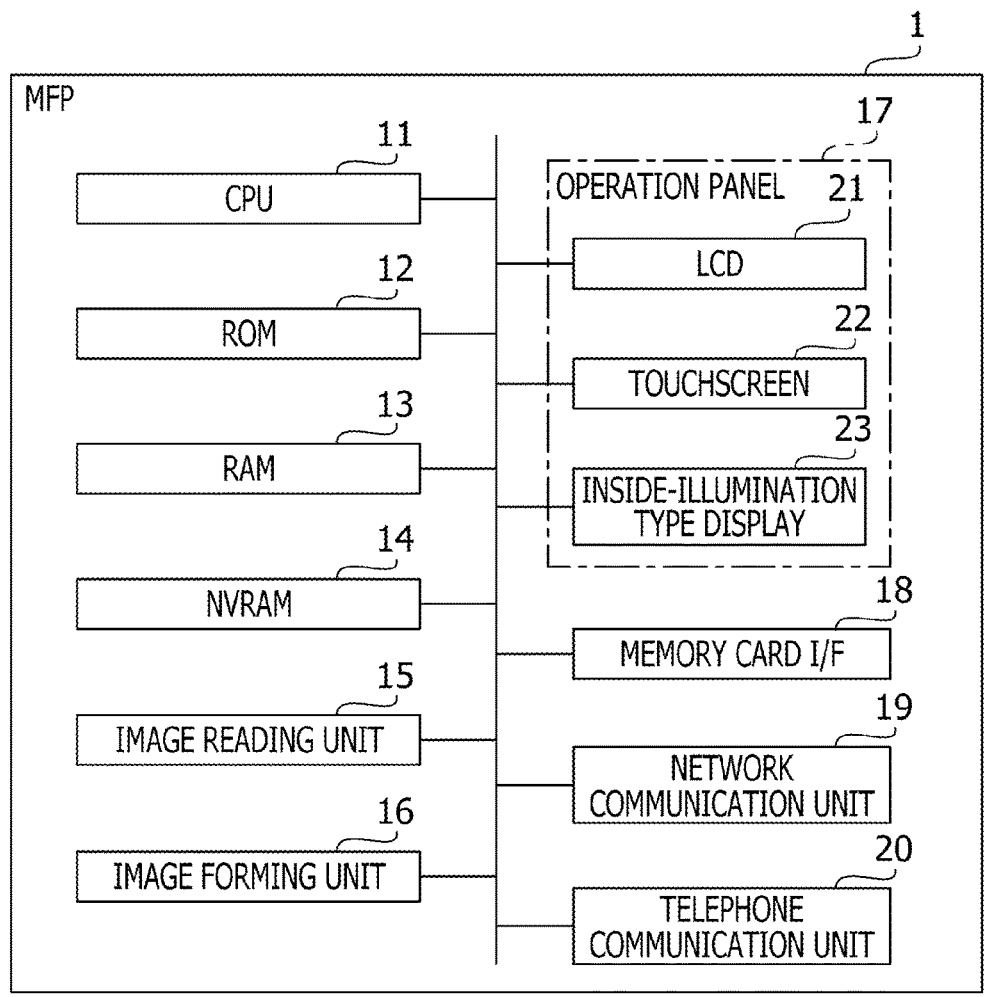
FIG. 1A is a block diagram schematically showing a configuration of a multi-function peripheral (hereinafter referred to as an "MFP") in an illustrative embodiment according to one or more aspects of the present disclosure.

As shown in FIG. 1A, a multi-function peripheral 1 (hereinafter referred to as the "MFP 1" in an abbreviated form) of an illustrative embodiment includes a CPU 11, a ROM 12, a RAM 13, a non-volatile random access memory 14 (hereinafter referred to as the "NVRAM 14"), an image reading unit 15, an image forming unit 16, an operation panel unit 17, a memory card interface 18 (hereinafter, which may be referred to as the memory card I/F 18), a network communication unit 19, and a telephone communication unit 20.

The CPU 11 is configured to take control of each element included in the MFP 1 in accordance with various programs stored in at least one of the ROM 12 and the NVRAM 14. The RAM 13 is used as a work area for storing various kinds of information and as a main memory for storing image data. The NVRAM 14 is a non-volatile memory that is able to electrically rewrite contents stored therein. The NVRAM 14 stores firmware, various setting values, programs, and various kinds of data. Specifically, for instance, the NVRAM 14 stores a program for a below-mentioned display control process (see FIGS. 7 to 9), and data of a below-mentioned list image 40 (see FIG. 2). It is noted that the program for the display control process and the data of the list image 40 may be stored in at least one of the ROM 12 and the NVRAM 14.

The image reading unit 15 is configured to read an image of a document sheet by an image sensor and generate image data expressing the read image. The image forming unit 16 is configured to print an image on a sheet-like recording medium (e.g., a recording paper). The memory card I/F 18 is an interface into which various memory cards are attached. The memory card I/F 18 is configured to control operations of writing data into a memory card and reading data from the memory card. The network communication unit 19 includes a network interface card. The network communication unit 19 is configured to perform data communication with an external device by a particular communication system. The telephone communication unit 20 includes a modem. The telephone communication unit 20 is used for voice communication and facsimile communication via a telephone line (not shown).

Figure 1B:
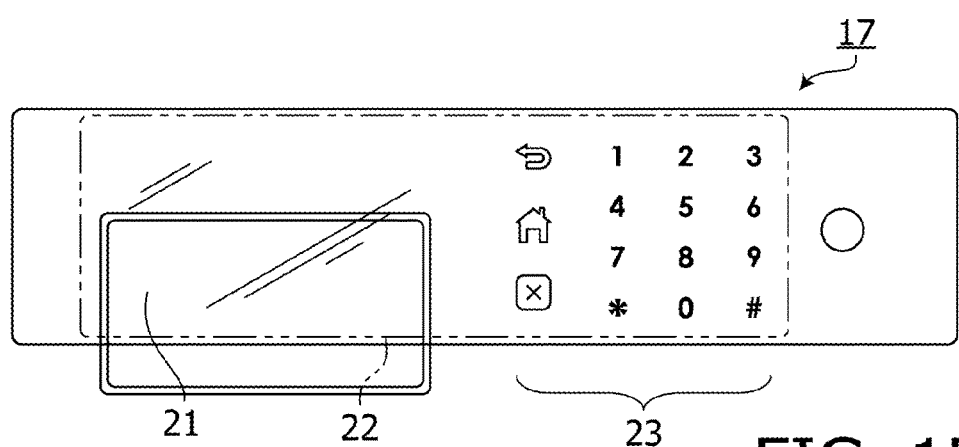
FIG. 1B is an external view of an operation panel of the MFP in the illustrative embodiment according to one or more aspects of the present disclosure.

The operation panel unit 17 includes a liquid crystal display 21 (hereinafter referred to as the "LCD 21" in an abbreviated form), a touchscreen 22, and an inside-illumination type display 23. The liquid crystal display 21, the touchscreen 22, and the inside-illumination type display 23 are disposed as shown in FIG. 1B. The LCD 21 is configured to display thereon various kinds of information such as the functions and an operational state of the MFP 1.

The touchscreen 22 is a transparent-film-shaped input device configured to detect a touch (pressing) operation using an indication body such as a finger and a stylus. The touchscreen 22 is disposed on display surfaces of the LCD 21 and the inside-illumination type display 23 in an overlapped (integrated) manner. In the illustrative embodiment, at least tapping and dragging may be cited as detectable touch operations on the touchscreen 22. The inside-illumination type display 23 is configured to display (images representing) numeric keypads and operable buttons.

The MFP 1 has major functions such as a facsimile function, a copy function, a scanning function, a digital camera print function, a cloud function, and a label print function. Each of these functions is actualized by the CPU 11 executing function programs stored in at least one of the ROM 12 and the NVRAM 14.

(2) List Image

When the MFP 1 is in a particular standby state, a standby screen is displayed on the LCD 21. The standby screen displays thereon icons representing the aforementioned plurality of functions. When tapping an icon associated with an intended function, a user is allowed to use the intended function.

For instance, when the user wishes to use the copy function, the user taps the icon representing the copy function. Thereby, the display on the LCD 21 is changed to an execution screen for executing the copy function. The copy function is a function to cause the image reading unit 15 to read an image of a document sheet and cause the image forming unit 16 to print the read image. On the execution screen for the copy function, a setting button is displayed. The setting button is for configuring setting values of various setting items for the copy function. When the setting button is tapped, the display on the LCD 21 is switched to a copy function setting screen 30 (hereinafter, which may simply be referred to as a "setting screen 30") exemplified in FIG. 2A.

As shown in FIG. 2A, on the setting screen 30, a list image 40 is displayed in a specific area (hereinafter referred to as a "list display area 31") of the whole screen. The list image 40 includes a plurality of item buttons 40-1, 40-2, . . . arranged in vertical direction of the setting screen 30.

More specifically, as shown in FIG. 2B, the list image 40 includes vertically-arranged n pieces of item buttons from a first item button 40-1 to an n-th item button 40-n. The first item button 40-1 is an item button for setting a quality level of copied images. When the first item button 40-1 is tapped, the display on the LCD 21 is switched to a copy quality setting screen for setting the quality level of copied images. When an intended quality level is selected and fixed, the display on the LCD 21 is again switched to the setting screen 30 shown in FIG. 2A.

The second item button 40-2 is an item button for setting a sheet type. The third item button 40-3 is an item button for setting a sheet size. The fourth item button 40-4 is an item button for setting a way to select a tray. The fifth item button 40-5 is an item button for setting a copy magnification. The sixth item button 40-6 is an item button for setting a copy density. The seventh item button 40-7 is an item button for making a choice between stack and sort.

Thus, the list image 40 includes the n pieces of item buttons 40-1 to 40-n arranged. Meanwhile, on the setting screen 30, the maximum number of item buttons displayable concurrently in the list display area 31 is four as shown in FIGS. 2A and 2B. FIGS. 2A and 2B show an example in which the four item buttons 40-1 to 40-4 (including the first item button 40-1 as an uppermost item button) of the list image 40 are displayed on the setting screen 30.

To display an item button that is not displayed in the list display area 31, the user has only to drag one of an upward arrow icon 33 and a downward arrow icon 34. The upward arrow icon 33 is an icon indicated by an arrow directed in an upward direction along the arrangement direction (i.e., the vertical direction) of the list image 40. The downward arrow icon 34 is an icon indicated by an arrow directed in a downward direction opposite to the direction of the upward arrow icon 33.

Each arrow icon 33 and 34, as a whole, is disposed to be adjacent to the list image 40 displayed in the list display area 31 and be in a middle portion in the arrangement direction of the list image 40. Each arrow icon 33 and 34 has a particular initial length in an initial state before any touch operation by the indication body has not performed to the arrow icons 33 and 34.

When the upward arrow icon 33 is dragged upward, the list image 40 is scrolled downward. Thereby, the icon buttons of the list image 40 to be displayed on the setting screen 30 make a transition to upper icon buttons that are positioned at an upper side of the list. When the downward arrow icon 34 is dragged downward, the list image 40 is scrolled upward. Thereby, the icon buttons of the list image 40 to be displayed on the setting screen 30 make a transition to lower icon buttons that are positioned at a lower side of the list.

In the state exemplified in FIGS. 2A and 2B, the first item button 40-1 as the uppermost item button is already displayed on the setting screen 30. Therefore, even though the upward arrow icon 33 is further dragged upward in this state, the list image 40 is not scrolled downward since there is no item button above the first item button 40. Meanwhile, when the downward arrow icon 34 is dragged downward in the state exemplified in FIGS. 2A and 2B, the list image 40 is scrolled upward. Thereby, item buttons positioned downstream in the list serially appear in the list display area 31 on the setting screen 30. When the downward dragging of the downward arrow icon 34 is continued, the upward scrolling of the list image 40 is continued. Then, when the n-th item button 40-n as the lowermost item button appears in the list display area 31, the scrolling is stopped.

(3) Scrolling Speed and Length of Each Arrow Icon

A scrolling speed at which the list image 40 is scrolled when each arrow icon 33 and 34 is dragged depends on a drag length Ld. The drag length Ld represents a dragging operation amount when each arrow icon 33 and 34 is dragged. Namely, the longer the drag length Ld is, the higher the scrolling speed is. In the illustrative embodiment, the drag length Ld is a vertical length component of the whole dragging operation amount.

Further, when each arrow icon 33 and 34 is dragged, the length of the dragged arrow icon is longer than the initial length thereof by a length corresponding to the drag length Ld. In the illustrative embodiment, the length of the dragged arrow icon is longer than the initial length thereof by a length equivalent to the drag length Ld. Hereinafter, detailed explanations will be provided of the length of each arrow icon 33 and 34 and the scrolling speed.

Figure 3A:
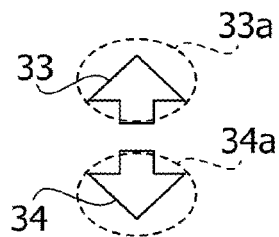

Firstly, an explanation will be provided of a relationship between an operation of dragging the arrow icons 33 and 34 and the length of the arrow icons 33 and 34, with reference to FIGS. 3A to 3D. As shown in FIG. 3A, arrow pressing detection areas 33a and 34a are set for the arrow icons 33 and 34 in their initial states, respectively. Specifically, an upward-arrow pressing detection area 33a is set for the upward arrow icon 33. When a position within the upward-arrow pressing detection area 33a is pressed (touched) by the indication body, tapping of the upward arrow icon 33 is detected. A downward-arrow pressing detection area 34a is set for the downward arrow icon 34. When a position within the downward-arrow pressing detection area 34a is pressed (touched) by the indication body, tapping of the downward arrow icon 34 is detected.

Figure 3B:
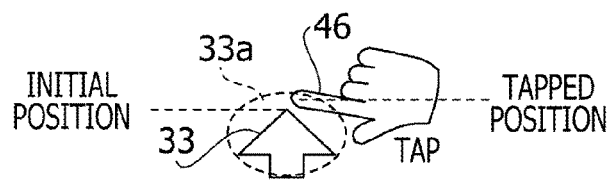

As shown in FIG. 3B, suppose, for instance, that (a position within) the upward-arrow pressing detection area 33a for the upward arrow icon 33 is tapped by an indication body 46. Only tapping the upward-arrow pressing detection area 33a does not cause any change in length of the upward arrow icon 33 or scrolling of the list image 40. It is noted that an initial position set for the upward arrow icon 33 in FIG. 3B is a tip position, in the vertical direction, of the upward arrow icon 33 with the initial length in the initial state with an initial length.

Figure 3C:
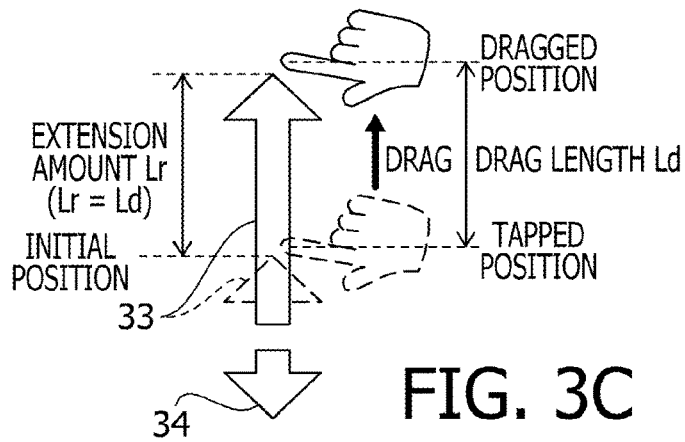

When the indication body 46 is dragged upward after the upward arrow icon 33 is tapped by the indication body 46, as shown in FIG. 3C, the upward arrow icon 33 becomes longer than the initial length by an extension amount Lr corresponding to the drag length Ld (i.e., the dragging operation amount of the indication body 46). In the illustrative embodiment, the extension amount Lr is equivalent to the drag length Ld (i.e., Lr=Ld). Further, as shown in FIG. 3C, during a period of time when the upward arrow icon 33 is being dragged by the indication body 46, the list image 40 is scrolled at a speed corresponding to the drag length Ld.

Figure 3D:
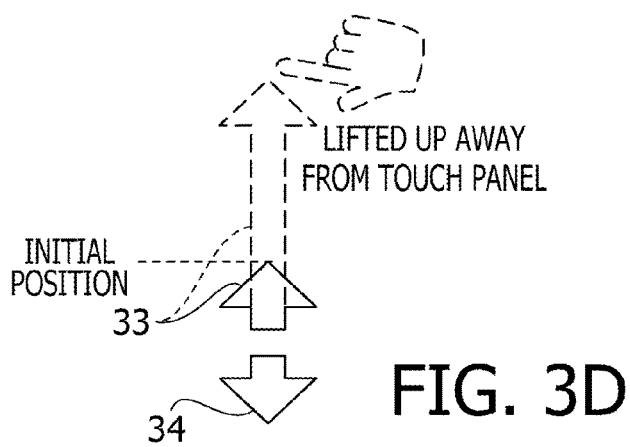

When the indication body 46 is lifted up and separated away from the touchscreen 22 in a state as shown in FIG. 3C where the upward arrow icon 33 has been dragged only by the drag length Ld, the upward arrow icon 33 is brought back to the initial state, as shown in FIG. 3D. Namely, the length of the upward arrow icon 33 returns to the initial length. At this time, the scrolling of the list image 40 is stopped. In this regard, however, the scrolling of the list image 40 is not stopped immediately after the indication body 46 is lifted up away from the touchscreen 22. In the illustrative embodiment, the scrolling speed gradually decreases after the indication body 46 is lifted up away from the touchscreen 22.

Hereinabove, operations to be executed in response to the upward arrow icon 33 being dragged have been described. Same applies to when the downward arrow icon 34 is dragged, except for the dragging direction (i.e., the downward direction) at the time that is opposite to the dragging direction (i.e., the upward direction) of the upward arrow icon 33.

Subsequently, an explanation will be provided of a relationship between the drag length Ld and the scrolling speed, with reference to FIGS. 4A to 4C. As described above, the longer the drag length Ld is, the higher the scrolling speed of the list image 40 is. For instance, as shown in FIG. 4A, when the drag length Ld is equal to Ld1, the scrolling speed is V1 corresponding to the drag length Ld1. At this time, the length of the upward arrow icon 33 is longer than the initial length by an extension amount Lr1 corresponding to the drag length Ld1.

When the drag length Ld is extended to Ld2 (which is longer than Ld1) by further moving the indication body 46 upward from the state shown in FIG. 4A, the scrolling speed increases to V2 corresponding to the drag length Ld2 as shown in FIG. 4B. At this time, the length of the upward arrow icon 33 is further extended from the state shown in FIG. 4A, and consequently becomes a length that is longer than the initial length by an extension amount Lr2 corresponding to the drag length Ld2.

When the drag length Ld is extended to Ld3 (which is longer than Ld2) by further moving the indication body 46 upward from the state shown in FIG. 4B, the scrolling speed increases to V3 corresponding to the drag length Ld3 as shown in FIG. 4C. At this time, the length of the upward arrow icon 33 is further extended from the state shown in FIG. 4B, and consequently becomes a length that is longer than the initial length by an extension amount Lr3 corresponding to the drag length Ld3.

It is possible to appropriately determine as needed how to actually change each arrow icon 33 and 34 in response to the change in the drag length Ld. For instance, the extension amount Lr of each arrow icon 33 and 34 may be increased by a unit extension amount ΔLr every increase of the drag length Ld by a unit increase amount ΔLd. Further, for instance, the extension amount Lr may be continuously increased in response to the increase of the drag length Ld. The extension amount Lr may be changed linearly or nonlinearly with respect to the drag length Ld. The aforementioned relationship between the drag length Ld and the extension amount Lr may be applied to the relationship between the drag length Ld and the scrolling speed.

(4) Bounding Operation by Arrow Icons

When the scrolling of the list image 40 is continued by one of the arrow icons 33 and 34 being continuously dragged, an item button positioned at an end portion of the list image 40 is eventually displayed in the list display area 31 on the setting screen 30, and the scrolling is stopped. At this time, in the illustrative embodiment, the color of the dragged arrow icon changes temporarily. Further, when the scrolling is stopped, even though the indication body 46 is still touching the touchscreen 22 (i.e., even though the dragging by the indication body 46 is continued), the dragged arrow icon performs a bounding operation. Specifically, the dragged arrow icon returns to the initial state with the initial length from the state where the arrow icon is extended as long as a length corresponding to the drag length Ld.

For instance, when the upward arrow icon 33 is dragged upward, the list image 40 is scrolled downward. Thereby, the item buttons to be displayed on the setting screen 30 make a sequential transition to upper-side item buttons of the list image 40. When the dragging of the upward arrow icon 33 is further continued, as shown in FIG. 5A, the first item button 40-1 positioned at the upper end of the list image 40 appears at the highest level of the list display area 31, and the scrolling is stopped at that state. At this time, the color of the upward arrow icon 33 changes temporarily (e.g., from an original color "white" to "red"). Then, as shown in FIG. 5B, the upward arrow icon 33 bounds such that the length thereof returns to the initial length. As described above, the color of the upward arrow icon 33 changes temporarily. In this regard, it is possible to appropriately determine as needed at which point of time the color of the upward arrow icon 33 should be returned to the original color. For instance, the color of the upward arrow icon 33 may be changed before the upward arrow icon 33 bounds. Further, the color of the upward arrow icon 33 may be returned to the original color after the upward arrow icon 33 has bounded (the length of the upward arrow icon 33 has returned to the initial length). Alternatively, the changed color of the upward arrow icon 33 may be maintained for a while after the upward arrow icon 33 has bounded (the length of the upward arrow icon 33 has returned to the initial length). Thereafter, the color of the upward arrow icon 33 may be returned to the original color after a lapse of a particular period of time.

In an end button displayed state where one of the uppermost item button and the lowermost item button of the list image 40 is already displayed, when the pressed arrow icon is further dragged in such a direction as to attempt to display an area further beyond the already-displayed one of the uppermost item button and the lowermost item button, the dragged arrow icon performs a small bounding operation.

As shown in FIG. 5A, suppose for instance that the first item button 40-1 positioned at the upper end of the list image 40 appears at the highest level of the list display area 31, and the scrolling is stopped at that state. The state is an end stop state where the list image 40 is not allowed to be scrolled downward anymore, i.e., where the list image 40 remains stopped without being scrolled downward even though the upward arrow icon 33 is dragged upward.

In the end stop state, when the upward arrow icon 33 is tapped by the indication body 46 as shown in FIG. 6A and is dragged upward as shown in FIG. 6B, the upward arrow icon 33 is temporarily extended by a small extension amount as shown in FIG. 6B. The small extension amount is fixed regardless of the drag length Ld. A period of time during which the upward arrow icon 33 is temporarily extended by the small extension amount is a particular short period of time (e.g., 0.1 seconds). Further, the color of the upward arrow icon 33 temporarily changes in response to the upward arrow icon 33 being temporarily extended by the small extension amount.

After the upward arrow icon 33 is temporarily extended by the small extension amount for the particular short period of time, the upward arrow icon 33 bounds such that the length thereof returns to the initial length as shown in FIG. 6B. In this regard, it is possible to appropriately determine as needed at which point of time the color of the upward arrow icon 33 should be returned to the original color. For instance, the changed color of the upward arrow icon 33 may be maintained during the particular short period of time when the upward arrow icon 33 is temporarily extended by the small extension amount. Further, the color of the upward arrow icon 33 may be returned to the original color in response to the upward arrow icon 33 bounding. Alternatively, the changed color of the upward arrow icon 33 may be maintained for a while after the upward arrow icon 33 has bounded, and thereafter, the color of the upward arrow icon 33 may be returned to the original color.

(5) Display Control Process

Subsequently, referring to FIGS. 7 to 9, an explanation will be provided of a display control process to be executed by the CPU 11 of the MFP 1. The display control process includes the aforementioned operations such as scrolling the list image 40 and extending and contracting the pressed arrow icon. After being activated, the CPU 11 loads a program for the display control process exemplified in FIGS. 7 to 9 from the NVRAM 14 and executes the program.

When starting the display control process shown in FIGS. 7 to 9, the CPU 11 controls the LCD 21 to display the setting screen 30 (S100). Actually, when the display control process is started, a home screen is first displayed. Thereafter, via one or more particular screen transition operations performed on the home screen, the setting screen 30 is displayed. In the display control process shown in FIGS. 7 to 9, operations related to screen transition to be executed until the setting screen 30 is displayed are omitted.

In S110, the CPU 11 executes an event accepting operation. In the illustrative embodiment, depending on a contact state between the indication body 46 and the touchscreen 22, an event such as a pressing event, a moving event, or a separating event is irregularly caused. Further, a screen updating event is regularly caused. In S110, when one of the aforementioned events is caused, the CPU 11 accepts the caused event.

In S120, the CPU 11 determines whether the CPU 11 has accepted the pressing event in S110. The pressing event is caused when a position on the touchscreen 22 is tapped (pressed) by the indication body 46. When determining that the CPU 11 has accepted the pressing event in S110 (S120: Yes), the CPU 11 goes to S130. In S130, the CPU 11 determines whether the pressed position (the position tapped by the indication body 46) on the touchscreen 22 is within one of arrow pressing detection areas. For instance, when the list image 40 and the arrow icons 33 and 34 are displayed on the LCD 21 as exemplified in FIG. 2A, the CPU 11 determines whether the pressed position is within one of the arrow pressing detection areas 33a and 34a (see FIG. 3A). When determining that the pressed position (the position tapped by the indication body 46) on the touchscreen 22 is not within one of the arrow pressing detection areas (S130: No), the CPU 11 goes to S160. It is noted that when any arrow icon is not displayed on the LCD 21, the CPU 11 makes a negative determination (S130: No) and goes to S160. In S160, the CPU 11 executes a regular pressing operation. Specifically, the CPU 11 executes an operation corresponding to an image displayed in the pressed position. After execution of the regular pressing operation in S160, the CPU 11 goes back to S110.

When determining in S103 that the pressed position (the position tapped by the indication body 46) on the touchscreen 22 is within one of the arrow pressing detection areas (S130: Yes), the CPU 11 goes to S140. In S140, the CPU 11 executes a list moving mode transition operation. Specifically, the CPU 11 sets an operation mode of the MFP 1 to a list moving mode. In S150, the CPU 11 executes a pressed position storing operation. Specifically, the CPU 11 stores coordinates of the position tapped by the indication body 46. After S150, the CPU 11 goes back to S110. It is noted that when the CPU 11 makes the affirmative determination in S130 (S130: Yes), the LCD 21 is in a state where the list image 40 and the arrow icons 33 and 34 are displayed thereon as exemplified in FIG. 2A.

When determining in S120 that the CPU 11 has not accepted the pressing event in S110 (S120: No), the CPU 11 goes to S170. In S170, the CPU 11 determines whether the CPU 11 has accepted a moving event in S110. The moving event is an event caused when the indication body 46 is moved (dragged) over a particular distance while being in contact with the touchscreen 22.

When determining that the CPU 11 has accepted a moving event in S110 (S170: Yes), the CPU 11 goes to S180. In S180, the CPU 11 determines whether the operation mode is set to the list moving mode. When determining that the operation mode is not set to the list moving mode (S180: No), the CPU 11 goes to S220. In S220, the CPU 11 executes a regular moving operation. Specifically, the CPU 11 executes a particular operation corresponding to the indication body 46 being dragged in an area outside the arrow icons 33 and 34. After execution of the regular moving operation in S220, the CPU 11 goes back to S110.

When determining in S180 that the operation mode is set to the list moving mode (S180: Yes), the CPU 11 goes to S190. In S190, the CPU 11 stores a pressed-position difference between the pressed position stored in S150 and the current position pressed by the indication body 46 (a pressed-position difference storing operation). More specifically, the pressed-position difference represents a component, in the direction indicated by the pressed arrow icon (that is along the arrangement direction of the item buttons of the list image 40 and a scrolling direction of the list image 40), of a distance between the pressed position stored in S150 and the current position pressed by the indication body 46. In other words, the operation in S190 includes detecting and storing the drag length Ld (see FIG. 3).

In S200, based on the pressed-position difference (i.e., the drag length Ld) stored in S190, the CPU 11 determines a list moving speed, i.e., the scrolling speed for the list image 40 (a list moving speed determining operation). In S210, the CPU 11 executes a list moving speed storing operation, i.e., stores the list moving speed determined in S200. After S210, the CPU 11 goes back to S110.

When determining in S170 that the CPU 11 has not accepted a moving event in S110 (S170: No), the CPU 11 goes to S230. In S230, the CPU 11 determines whether the CPU 11 has accepted a separating event. The separating event is an event caused when the contact between the indication body 46 and the touchscreen 22 is released, i.e., when the indication body 46 is lifted up and separated away from the touchscreen 22.

When determining that the CPU 11 has accepted a separating event (S230: Yes), the CPU 11 goes to S240. In S240, the CPU 11 determines whether the operation mode is set to the list moving mode. When determining that the operation mode is not set to the list moving mode (S240: No), the CPU 11 goes to S270. In S270, the CPU 11 executes a regular separating operation. Specifically, the CPU 11 executes a particular operation corresponding to the indication body 46 being separated away from the touchscreen 22 in an area outside the arrow icons 33 and 34. After execution of the regular separating operation in S270, the CPU 11 goes back to S110.

When determining in S240 that the operation mode is set to the list moving mode (S240: Yes), the CPU 11 goes to S250. In S250, the CPU 11 initializes the pressed-position difference (i.e., the drag length Ld) between the pressed position stored in S150 and the current position pressed by the indication body 46 (a pressed-position difference initializing operation). Specifically, the CPU 11 sets the pressed-position difference to zero. In S260, the CPU 11 executes a list moving termination mode transition operation. Specifically, the CPU 11 sets the operation mode to a list moving termination mode. After S260, the CPU 11 goes back to S110.

When determining in S230 that the CPU 11 has not accepted a separating event (S230: No), the CPU 11 goes to S280 (see FIG. 8). As shown in FIG. 8, in S280, the CPU 11 determines whether the CPU 11 has accepted a screen updating event in S110. The screen updating event is an event caused regularly (e.g., every 50 msec) to switch the screen displayed on the LCD 21 at a particular frame rate (e.g., 20 fps).

When determining that the CPU 11 has not accepted a screen updating event in S110 (S280: No), the CPU 11 goes back to S110. Meanwhile, when determining that the CPU 11 has accepted a screen updating event in S110 (S280: Yes), the CPU 11 goes to S290. In S290, the CPU 11 determines whether the operation mode is set to the list moving mode. When determining that the operation mode is set to the list moving mode (S290: Yes), the CPU 11 goes to S300. In S300, the CPU 11 executes a list moving speed acquiring operation. Specifically, the CPU 11 acquires the list moving speed stored in S210. In S310, based on the list moving speed acquired in S300, the CPU 11 executes a list moving amount determining operation, i.e., determines a list moving amount (i.e., a scrolling amount). The list moving amount determined in S310 is a moving distance per unit cycle of the periodically-caused screen updating event. In S310, the CPU 11 sets a larger value of the list moving amount as the moving speed is higher (as the drag length Ld is longer).

In S320, the CPU 11 determines whether it is possible to move (scroll) the list image 40 by the list moving amount determined in S310. When determining that it is possible to move the list image 40 by the list moving amount determined in S310 (i.e., when determining that the tail end of the list image 40 in the scrolling direction still would not appear in the list display area 31 after the list image 40 is scrolled by the list moving amount determined in S310) (S320: Yes), the CPU 11 goes to S370.

Meanwhile, when determining that it is not possible to move the list image 40 by the list moving amount determined in S310 (i.e., when determining that the tail end of the list image 40 in the scrolling direction would appear in the list display area 31 such that the list image 40 is not allowed to be scrolled anymore before an actually-scrolled amount of the list image 40 reaches the list moving amount determined in S310) (S320: No), the CPU 11 goes to S330.

In S330, the CPU 11 again determines the list moving amount within a list movable range. Namely, the CPU 11 determines a maximum list movable amount up to which the list image 40 is allowed to be scrolled. In S340, the CPU 11 executes a pressed-position difference initializing operation. Specifically, the CPU 11 initializes the pressed-position difference (i.e., the drag length Ld) between the pressed position stored in S150 and the current position pressed by the indication body 46. Specifically, the CPU 11 sets the pressed-position difference to zero. Namely, even in a state where the pressed arrow icon is actually being dragging by the indication body 46, the CPU 11 forcibly sets the drag length Ld to zero based on the determination that the tail end of the list image 40 in the scrolling direction would appear in the list display area 31 before the actually-scrolled amount of the list image 40 reaches the list moving amount determined in S310. As a result of the initializing of the pressed-position difference, the bounding operation by the pressed arrow icon is achieved.

In S350, the CPU 11 executes a forcible termination mode transition operation. Specifically, the CPU 11 sets the operation mode to a forcible termination mode. In S360, the CPU 11 performs an arrow color changing operation. Specifically, the CPU 11 makes a setting change for the color of the pressed arrow icon from an initial value (e.g., white) to a particular different color (e.g., red).

In S370, the CPU 11 determines an arrow length (i.e., a length of the pressed arrow icon) based on the pressed-position difference (i.e., the drag length Ld) between the pressed position stored in S150 and the current position pressed by the indication body 46. Specifically, the CPU 11 determines the extension amount Lr of the pressed arrow icon based on the drag length Ld. In the illustrative embodiment, as described above, the extension amount Lr is determined to be identical to the drag length Ld. It is noted that when the pressed-position difference has been initialized by the operation in S340, the extension amount Lr is determined to be zero.

In S380, the CPU 11 executes an LCD drawing operation. Specifically, the CPU 11 controls the LCD 21 to display the list image 40 moved by the list moving amount determined in S310. In this respect, nonetheless, when determining the list moving amount in S330 (i.e., when determining that the list image 40 would be scrolled up to where the tail end thereof in the scrolling direction appears in the list display area 31), the CPU 11 controls the LCD 21 to display the list image 40 moved only by the list moving amount determined in S330. In this case, in the list display area 31 on the setting screen 30, the item button positioned at a tail end portion of the list image 40 in the scrolling direction is displayed, and a state is shown in which the list image 40 has been scrolled up to where the tail end thereof in the scrolling direction appears in the list display area 31.

Further, in S380, the CPU 11 changes the length of the pressed arrow icon to the arrow length determined in S370. At this time, when the arrow length is determined to be the initial length in S370 in response to the pressed-position difference being initialized in S340, the arrow length returns to the initial length (i.e., the pressed arrow icon bounds). Further, in S380, when the setting change has been made for the color of the pressed arrow icon in S360, the CPU 11 displays the pressed arrow icon with the changed color. It is noted that the color of the pressed arrow icon may be changed before or after the pressed arrow icon bounds (i.e., the length of the pressed arrow icon returns to the initial length). Further, it is possible to appropriately determine as needed how long the changed color of the pressed arrow icon should be maintained after the color of the pressed arrow icon is changed, though a corresponding operation is not shown in any of FIGS. 7 to 9. After S380, the CPU 11 goes back to S110.

When determining in S290 that the operation mode is not set to the list moving mode (S290: No), the CPU 11 goes to S390. In S390, the CPU 11 determines whether the operation mode is set to the list moving termination mode. When determining that the operation mode is set to the list moving termination mode (S390: Yes), the CPU 11 goes to S400. In S400, the CPU 11 executes a list moving speed determining operation. Specifically, the CPU 11 updates the list moving speed to a speed that is a particular amount lower than the current stored speed. It is noted that when the speed updated to be the particular amount lower than the currently-stored speed is a negative value, the CPU 11 updates the list moving speed to zero. In S410, the CPU 11 executes a list moving speed storing operation, i.e., stores the new list moving speed updated in S400.

In S420, the CPU 11 determines whether the list moving speed stored in S410 is zero. When determining that the list moving speed stored in S410 is zero (S420: Yes), the CPU 11 goes to S480. In S480, the CPU 11 sets the operation mode to a regular mode (a regular mode transition operation). After S480, the CPU 11 goes back to S110. When determining in S420 that the list moving speed stored in S410 is not zero (S420: Yes), the CPU 11 goes to S430.

In S430, based on the list moving speed determined in S400, the CPU 11 determines a list moving amount (i.e., a scrolling amount) in the same manner as in S310. In S440, the CPU 11 determines whether it is possible to move (scroll) the list image 40 by the list moving amount determined in S430. When determining that it is possible to move the list image 40 by the list moving amount determined in S430 (i.e., when determining that the tail end of the list image 40 in the scrolling direction still would not appear in the list display area 31 after the list image 40 is scrolled by the list moving amount determined in S430) (S440: Yes), the CPU 11 goes to S460.

Meanwhile, when determining that it is not possible to move the list image 40 by the list moving amount determined in S430 (i.e., when determining that the tail end of the list image 40 in the scrolling direction would appear in the list display area 31 such that the list image 40 is not allowed to be scrolled anymore before the actually-scrolled amount of the list image 40 reaches the list moving amount determined in S430) (S440: No), the CPU 11 goes to S450.

In S450, the CPU 11 again determines the list moving amount within a list movable range in the same manner as in S330. Namely, the CPU 11 determines a maximum list movable amount up to which the list image 40 is allowed to be scrolled. In S460, the CPU 11 executes an arrow length initializing operation. Specifically, the CPU 11 sets the length of the pressed arrow icon to the initial length.

In S470, the CPU 11 executes an LCD drawing operation. Specifically, the CPU 11 controls the LCD 21 to display the list image 40 moved by the list moving amount determined in S430 or S450. Further, in S470, the CPU 11 sets the length of the pressed arrow icon back to the initial length determined in S460. After S470, the CPU 11 goes back to S110. When determining in S390 that the operation mode is not set to the list moving termination mode (S390: No), the CPU 11 goes to S490 (see FIG. 9).

As shown in FIG. 9, in S490, the CPU 11 determines whether the operation mode is set to the forcible termination mode. When determining that the operation mode is not set to the forcible termination mode (S490: No), the CPU 11 goes to S530. In S530, the CPU 11 executes a regular drawing updating operation. Thereafter, the CPU 11 goes back to S110.

When determining in S490 that the operation mode is set to the forcible termination mode (S490: Yes), the CPU 11 goes to S500. In S500, the CPU 11 executes an arrow length changing operation. The arrow length changing operation is an operation for actualizing the small bounding operation described with reference to FIGS. 6A to 6C. Specifically, in the small bounding operation, the CPU 11 changes the current length of the pressed arrow icon by a change amount corresponding to a single frame of screen. In the illustrative embodiment, the CPU 11 changes the current length of the pressed arrow icon to a length after 50 msec. When the CPU 11 advances to S500 for the first time after the operation mode is set to the forcible termination mode, the CPU 11 changes the length of the pressed arrow icon to a length that is a small amount longer than the initial length. Meanwhile, when the length of the pressed arrow icon has already been changed to the length that is the small extension amount longer than the initial length after the CPU 11 repeatedly executed the operation in S500 in the forcible termination mode, the CPU 11 changes the length of the pressed arrow icon to a length that is a small amount shorter than the current length, so as to bound (the length of) the pressed arrow icon. Accordingly, as a result of repeatedly execution of the operation in S500, the pressed arrow icon performs the small bounding operation.

In S510, the CPU 11 determines whether the small bounding operation has been completed, i.e., whether the length of the pressed arrow icon has returned to the initial length. When determining that the small bounding operation has not been completed (S510: No), the CPU 11 goes back to S110. When determining that the small bounding operation has been completed (S510: Yes), the CPU 11 goes to S520. In S520, the CPU 11 sets the operation mode to the regular mode (the regular mode transition operation). After S520, the CPU 11 goes back to S110.

Suppose, for instance, that specifications of the small bounding operation are set such that the length of the pressed arrow icon changes by an amount $\Delta Lo/2$ each time the screen updating event occurs. It is noted that $\Delta Lo$ represents the small extension amount. In this case, when the CPU 11 advances to S500 for the first time, the length of the pressed arrow icon is set to a length (the initial length+$\Delta Lo/2$) that is $\Delta Lo/2$ longer than the initial length. When the CPU 11 advances to S500 again after occurrence of another screen updating event, the length of the pressed arrow icon is set to a length (the initial length+$\Delta Lo$) that is further extended by $\Delta Lo/2$. At this time, for instance, the color of the pressed arrow icon may be temporarily changed. When the CPU 11 advances to S500 again after occurrence of a further screen updating event, the length of the pressed arrow icon is set to the length (the initial length+$\Delta Lo/2$) that is shortened by $\Delta Lo/2$. At this time, for instance, the color of the pressed arrow icon may be returned to the original color. When the CPU 11 advances to S500 again after occurrence of a further screen updating event, the length of the pressed arrow icon is further shortened by $\Delta Lo/2$ and set to the initial length. Thereby, the small bounding operation is completed. Namely, in this example, the small bounding operation is performed through the four screen updating events.

In the display control process shown in FIGS. 7 to 9, the list image 40 is scrolled in response to the pressed arrow icon being dragged. Then, when the list image 40 is scrolled up to where the tail end thereof in the scrolling direction appears in the list display area 31, the pressed-position difference is initialized, and the pressed arrow icon is bounded. In this case, since the operation mode is set to the forcible termination mode in S350, the pressed arrow icon is once returned to the initial length by the above bounding, and thereafter performs the small bounding operation only once via the operations in S490 and the following steps. In this respect, nonetheless, the aforementioned operations, in which the pressed arrow icon once returns to the initial length and thereafter performs the small bounding operation when the list image is scrolled up to where the tail end thereof in the scrolling direction appears in the list display area 31, are just an example. When the list image is scrolled up to where the tail end thereof in the scrolling direction appears in the list display area 31, the pressed arrow icon may only perform a bounding operation of simply returning to the initial length.

(6) Advantageous Effects

According to the MFP 1 of the aforementioned illustrative embodiment, when the upward arrow icon 33 or the downward arrow icon 34 is dragged, the list image 40 is scrolled at a speed corresponding to the drag length Ld. Namely, by adjusting the drag length Ld, it is possible to adjust the scrolling speed. Therefore, it is possible to achieve improved operability and user-friendliness in scrolling of the list image 40.

In the illustrative embodiment, the scrolling speed for the list image 40 is higher as the drag length Ld is longer. Thereby, the user is allowed to make the scrolling speed higher by making the drag length Ld larger and make the scrolling speed lower by making the drag length Ld smaller. Therefore, the user is allowed to adjust the scrolling speed by an intuitive operation.

In the illustrative embodiment, each arrow icon 33 and 34 is set to the initial length in the initial state where each arrow icon 33 and 34 has not been dragged. When one of the arrow icons 33 and 34 is dragged, the length of the dragged arrow icon is changed to a length corresponding to the drag length Ld. Specifically, the longer the drag length Ld, the larger the extension amount Lr of the pressed arrow icon is. In the illustrative embodiment, the drag length Ld is equal to the extension amount Lr of the pressed arrow icon.

Thus, the length of each arrow icon 33 and 34 varies depending on the drag length Ld (i.e., depending on the scrolling speed for the list image 40). Therefore, the user is allowed to intuitively grasp the scrolling speed for the list image 40 by viewing the length of the pressed arrow icon. Therefore, the user is allowed to easily adjust the scrolling speed for the list image 40.

In the illustrative embodiment, when the list image 40 is scrolled up to where the tail end thereof in the scrolling direction appears in the list display area 31, the scrolling of the list image 40 is stopped, and the length of the pressed arrow icon returns to the initial length. Therefore, the user is allowed to easily recognize that the list image 40 has been scrolled up to where the tail end thereof in the scrolling direction appears in the list display area 31, by acknowledging that the scrolling of the list image 40 has been stopped and that the length of the pressed arrow icon has been initialized.

In the illustrative embodiment, when the pressed arrow icon is further dragged in the end button displayed state in which the list image 40 has already been scrolled up to where the item button positioned a tail end portion of the list image 40 in the scrolling direction appears in the list display area 31, the pressed arrow icon performs the small bounding operation. By acknowledging the small bounding operation, the user is allowed to easily recognize that the list image 40 has already been scrolled up to where the tail end thereof in the scrolling direction appears in the list display area 31.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modifications]

(1) List images to which aspects of the present disclosure are applicable are not limited to the list image 40 exemplified in FIGS. 2A and 2B. Object images that form the list image are not limited to the item buttons 40-1 to 40-n exemplified in FIGS. 2A and 2B. Further, arrangement directions of the object images are not limited to the arrangement direction of the item buttons 40-1 to 40-n exemplified in FIGS. 2A and 2B. Aspects of the present disclosure may be applied to every type of display controller configured to display on a display a part of a list image including a plurality of object images arranged in a particular arrangement direction, scroll the list image, and change object images displayed on the display.

For instance, aspects of the present disclosure may be applied to a setting screen 60 as exemplified in FIG. 10. On the setting screen 60 shown in FIG. 10, a list image 70 is displayed in a list display area 61. The list image 70 is formed by a plurality of menu icons 70-1, 70-2, 70-3, ... arranged in a left-to-right direction. The list image 70 includes four or more menu icons. Nonetheless, a maximum number of menu icons concurrently displayable in the list display area 61 is three. Therefore, in order to display other menu icons that are not displayed in the list display area 61, it is required to scroll the list image 70 in the left-to-right direction.

The list image 70 is scrolled in the left-to-right direction in response to one of a leftward arrow icon 63 and a rightward arrow icon 64 being dragged. Specifically, when the leftward arrow icon 63 is dragged leftward, the whole list image 70 is scrolled rightward. Thereby, contents of the list image 70 displayed on the setting screen 60 make a transition to left-side menu icons (i.e., left-side menu icons that have not displayed appear on the setting screen 60). Meanwhile, when the rightward arrow icon 64 is dragged rightward, the whole list image 70 is scrolled leftward. Thereby, the contents of the list image 70 displayed on the setting screen 60 make a transition to right-side menu icons (i.e., right-side menu icons that have not displayed appear on the setting screen 60).

In the same manner as exemplified in the aforementioned illustrative embodiment, the setting screen 60 may be configured such that a scrolling speed for the list image 70 varies depending on a drag length of the pressed arrow icon. Further, the setting screen 60 may be configured such that a length of the pressed arrow icon varies depending on the drag length of the pressed arrow icon. Moreover, with respect to a bounding operation, a small bounding operation, and a color change of the pressed arrow icon, the setting screen 60 may be configured in the same manner as exemplified in the aforementioned illustrative embodiment.

(2) A shape and a size of each arrow icon may be determined appropriately as needed. Further, a relative display position of each arrow icon with respect to the list image on the LCD 21 may be determined appropriately as needed. Further, the upward arrow icon and the downward arrow icon do not necessarily have to be displayed apart from each other. The upward arrow icon and the downward arrow icon may be displayed as a single two-way arrow that indicates mutually-opposite two directions. Furthermore, in the first place, any arrow icon does not necessarily have to be displayed. Instead, icons having a shape different from an arrow may be displayed.

(3) Operations to the arrow icons for scrolling the list image are not limited to dragging by the indication body 46 on the touchscreen 22. For instance, the list image may be scrolled by other moving operations such as flicking the arrow icons and swiping the arrow icons.

Further, instead of the touch operation on the touchscreen 22, other input methods may be used to drag the arrow icons. For instance, the list image may be scrolled when one of the arrow icons is dragged with a mouse pointer.

(4) Aspects of the present disclosure may be applied not only to the MFP 1 but also to any type of information processing terminal device that includes a display and is configured to display the list image on the display.

What is claimed is:

1. A display control apparatus comprising:
a storage configured to store a list image, the list image comprising a plurality of object images;
a display having a display area, the display area being configured to concurrently display a particular number of object images of the plurality of object images; and
a controller comprising at least one of an integrated circuit and a processor executing processor-executable instructions stored in a memory, the controller configured to:
display the particular number of object images arranged along a particular direction in the display area;
display a specific indication image in the display area, the specific indication image indicating a specific direction along the particular direction;
detect a dragging operation of dragging the specific indication image in the specific direction;
control the display such that the particular number of object images are scrolled in the particular direction;
set a length of the specific indication image in the specific direction to a specific initial length, when not detecting the dragging operation of dragging the specific indication image in the specific direction;
set a length of the specific indication image in the specific direction from the specific initial length to a specific target length, when detecting the dragging operation of dragging the specific indication image in the specific direction;
stop the scrolling of the list image, when a tail-end object image positioned at a tail end portion of the list image in the scrolling direction appears in the display area and reaches a particular position in response to the list image being scrolled in the scrolling direction;
return the length of the specific indication image to the specific initial length, when stopping the scrolling, and
determine, when the tail-end object image has reached the particular position, whether the dragging operation of the specific indication image is still continuing in the particular direction,
wherein the controller is configured to forcibly return the length of the specific indication image to the specific initial length when it is determined that the dragging operation of the specific indication image is still continuing in the particular direction when the tail-end object image has reached the particular position, and
wherein the controller is further configured to, when the dragging operation of dragging the specific indication image in the specific direction is performed in a state where the tail-end object image positioned at the tail end portion of the list image in the scrolling direction is displayed in the particular position in the display area, execute an extending-contracting operation of:
extending the length of the specific indication image by a particular length for a particular period of time, the particular period of time starting when an extension amount of the specific indication image becomes the particular length; and
thereafter returning the length of the specific indication image to the specific initial length.

2. The display control apparatus according to claim 1, wherein the controller is further configured to:
detect a dragging operation amount of the detected dragging operation; and
set a scrolling speed such that the particular number of object images are scrolled faster as the detected dragging operation amount increases.

3. The display control apparatus according to claim 2, wherein the specific target length is associated with the detected dragging operation amount.

4. The display control apparatus according to claim 3, wherein the controller is further configured to set the specific target length longer as the detected dragging amount is larger.

5. The display control apparatus according to claim 1, wherein the controller is further configured to, when stopping the scrolling of the list image, change a color of the specific indication image.

6. The display control apparatus according to claim 1, wherein the controller is further configured to, when executing the extending-contracting operation, change a color of the specific indication image.

7. The display control apparatus according to claim 1, wherein the controller comprises:
the processor and
the memory storing the processor-executable instructions configured to, when executed by the processor, cause the processor to:
display the particular number of object images in the display area;
display the specific indication image in the display area;
detect the dragging operation of dragging the specific indication image in the specific direction;
control the display such that the particular number of object images are scrolled in the particular direction;
set a length of the specific indication image in the specific direction to a specific initial length, when not detecting the dragging operation of dragging the specific indication image in the specific direction;
set a length of the specific indication image in the specific direction from the specific initial length to a specific target length, when detecting the dragging operation of dragging the specific indication image in the specific direction;
stop the scrolling of the list image, when a tail-end object image positioned at a tail end portion of the list image in the scrolling direction appears in the display area and reaches a particular position in response to the list image being scrolled in the scrolling direction; return the length of the specific indication image to the specific initial length, when stopping the scrolling, and
determine, when the tail-end object image has reached the particular position, whether the dragging operation of the specific indication image is still continuing in the particular direction, wherein the processor is configured to forcibly returns the length of the specific indication image to the specific initial length when it is determined that the dragging operation of the specific indication image is still continuing in the particular direction when the tail-end object image has reached the particular position, and wherein the processor is further configured to, when the dragging operation of dragging the specific indication image in the specific direction is performed in a state where the tail-end object image positioned at the tail end portion of the list image in the scrolling direction is displayed in the particular position in the display area, execute an extending-contracting operation of:

extending the length of the specific indication image by a particular length for a particular period of time, the particular period of time starting when an extension amount of the specific indication image becomes the particular length; and thereafter returning the length of the specific indication image to the specific initial length.

8. A method adapted to be implemented on a processor coupled with:

a storage configured to store a list image, the list image comprising a plurality of object images; and a display having a display area, the display area being configured to concurrently display a particular number of object images of the plurality of object images, the method comprising:

displaying the particular number of object images arranged along a particular direction in the display area;

displaying a specific indication image in the display area, the specific indication image indicating a specific direction along the particular direction;

detecting a dragging operation of dragging the specific indication image in the specific direction;

controlling the display such that the particular number of object images are scrolled in the particular direction;

setting a length of the specific indication image in the specific direction to a specific initial length, when not detecting the dragging operation of dragging the specific indication image in the specific direction;

setting a length of the specific indication image in the specific direction from the specific initial length to a specific target length, when detecting the dragging operation of dragging the specific indication image in the specific direction;

stopping the scrolling of the list image, when a tail-end object image positioned at a tail end portion of the list image in the scrolling direction appears in the display area and reaches a particular position in response to the list image being scrolled in the scrolling direction;

returning the length of the specific indication image to the specific initial length, when stopping the scrolling, determining, when the tail-end object image has reached the particular position, whether the dragging operation of the specific indication image is still continuing in the particular direction, wherein, the method comprises forcibly returning the length of the specific indication image to the specific initial length when it is determined that the dragging operation of the specific indication image is still continuing in the particular direction when the tail-end object image has reached the particular position, and wherein, when the dragging operation of dragging the specific indication image in the specific direction is performed in a state where the tail-end object image positioned at the tail end portion of the list image in the scrolling direction is displayed in the particular position in the display area, the method further comprises executing an extending-contracting operation of:

extending the length of the specific indication image by a particular length for a particular period of time, the particular period of time starting when an extension amount of the specific indication image becomes the particular length; and thereafter returning the length of the specific indication image to the specific initial length.

9. A non-transitory computer-readable medium storing computer-readable instructions that are executable by a processor coupled with:

a storage configured to store a list image, the list image comprising a plurality of object images; and a display having a display area, the display area being configured to concurrently display a particular number of object images of the plurality of object images, the instructions being configured to, when executed by the processor, cause the processor to:

display the particular number of object images arranged along a particular direction in the display area;

display a specific indication image in the display area, the specific indication image indicating a specific direction along the particular direction;

detect a dragging operation of dragging the specific indication image in the specific direction;

control the display such that the particular number of object images are scrolled in the particular direction;

set a length of the specific indication image in the specific direction to a specific initial length, when not detecting the dragging operation of dragging the specific indication image in the specific direction;

set a length of the specific indication image in the specific direction from the specific initial length to a specific target length, when detecting the dragging operation of dragging the specific indication image in the specific direction;

stop the scrolling of the list image, when a tail-end object image positioned at a tail end portion of the list image in the scrolling direction appears in the display area and reaches a particular position in response to the list image being scrolled in the scrolling direction;

return the length of the specific indication image to the specific initial length, when stopping the scrolling, determine, when the tail-end object image has reached the particular position, whether the dragging operation of the specific indication image is still continuing in the particular direction, wherein, the processor forcibly returns the length of the specific indication image to the specific initial length when it is determined that the dragging operation of the specific indication image is still continuing in the particular direction when the tail-end object image has reached the particular position, and wherein, the instructions are further configured to, when executed by the processor, cause the processor to execute an extending-contracting operation of:

extending, when the dragging operation of dragging the specific indication image in the specific direction is performed in a state where the tail-end object image positioned at the tail end portion of the list image in the scrolling direction is displayed in the particular position in the display area, the length of the specific indication image by a particular length for a particular period of time, the particular period of time starting when an extension amount of the specific indication image becomes the particular length and thereafter returning the length of the specific indication image to the specific initial length.

10. The non-transitory computer-readable medium according to claim 9,
wherein the instructions are further configured to, when executed by the processor, cause the processor to:
detect a dragging operation amount of the detected dragging operation; and
set a scrolling speed such that the particular number of object images are scrolled faster as the detected dragging operation amount increases.

11. The non-transitory computer-readable medium according to claim 10,
wherein the specific target length is associated with the detected dragging operation amount.

12. The non-transitory computer-readable medium according to claim 11,
wherein the instructions are further configured to, when executed by the processor, cause the processor to set the specific target length longer as the detected dragging amount is larger.

13. The non-transitory computer-readable medium according to claim 9,
wherein the instructions are further configured to, when executed by the processor, cause the processor to, when stopping the scrolling of the list image, change a color of the specific indication image.

14. The non-transitory computer-readable medium according to claim 9,
wherein the instructions are further configured to, when executed by the processor, cause the processor to, when executing the extending-contracting operation, change a color of the specific indication image.

* * * * *